Aug. 1, 1939. P. HEISEL ET AL 2,168,260
PROCESS OF PREPARING MONOHALOGENATION PRODUCTS
Filed Nov. 2, 1936
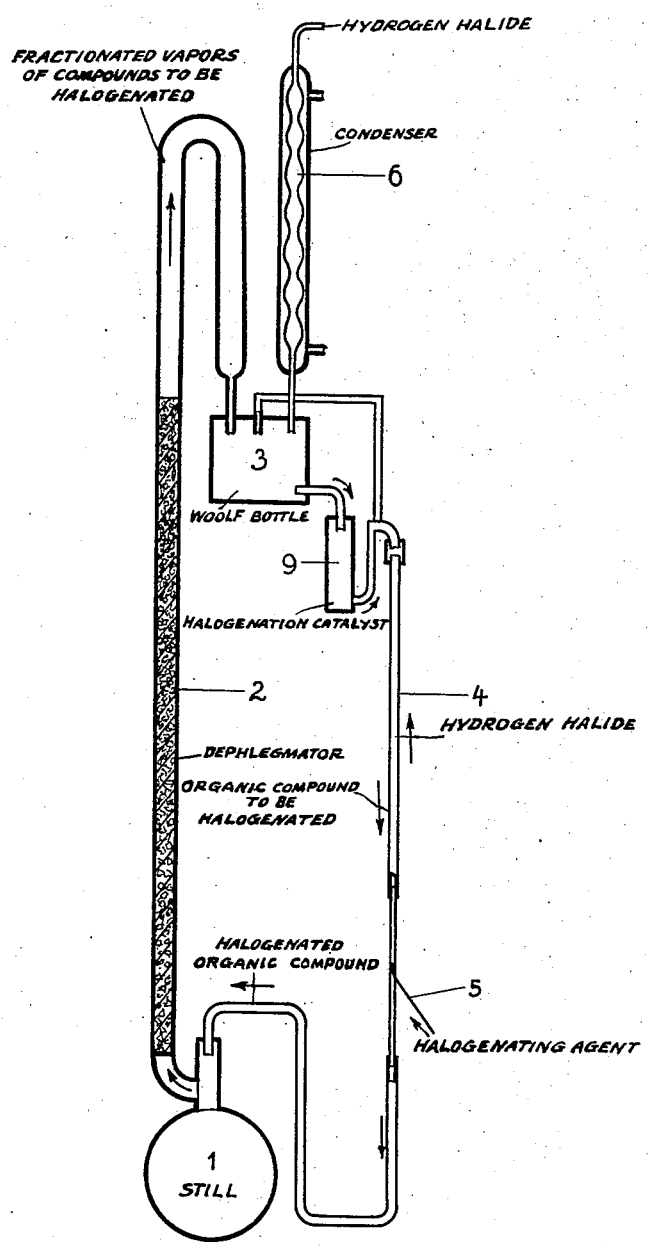
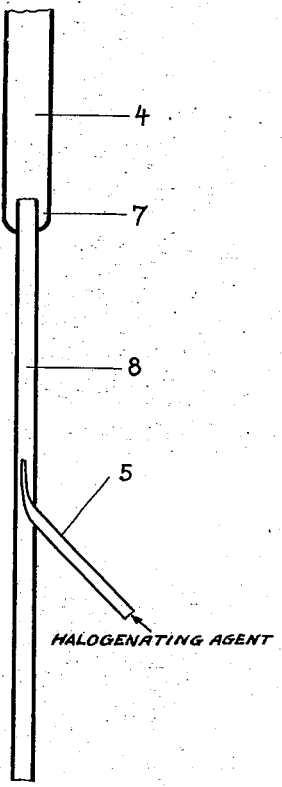
INVENTORS:
Paul Heisel,
Albert Hendschel
By Potter, Pierce & Scheffler
ATTORNEYS.

Patented Aug. 1, 1939

2,168,260

UNITED STATES PATENT OFFICE 2,168,260

PROCESS OF PREPARING MONOHALOGENATION PRODUCTS

Paul Heisel and Albert Hendschel, Gersthofen, near Augsburg, Germany, assignors to I. G. Farbenindustrie Aktiengesellschaft, Frankfort-on-the-Main, Germany Application November 2, 1936, Serial No. 108,910
In Germany November 10, 1934

5 Claims. (Cl. 260—539)

The present invention relates to a process of preparing mono-halogenation products.

Various processes are already known for halogenating organic substances in the liquid phase in the presence or absence of catalysts. The halogenation is generally performed, for instance, in a vessel provided or not with a stirrer by introducing the halogen into the liquid to be treated which, if desired, may be charged with a catalyst. In order to keep the formation of more highly halogenated by-products within relatively moderate limits the halogenation must be interrupted, in many cases long before the substance introduced is entirely transformed into the desired derivative. After the unaltered starting material has been expelled by distillation there must still be expected some 10 to 20 per cent of by-products, a quantity which in certain cases may endanger economic operation of the process.

Now we have found a process whereby the formation of more highly halogenated products, can be completely prevented and uniform halogenation products (mono-halogen derivatives) can be obtained nearly quantitatively. For this purpose the liquid substance to be halogenated and the halogenating agent are caused to circulate in counter-current, and the reaction product is eliminated immediately from the halogenation zone and does not re-enter this zone. It is thus possible to halogenate quantitatively and uniformly and in one operation an exactly defined quantity of substance, without the formation of a quantity of by-products (higher halogenation products) exceeding about 2 to 3 per cent. The substance to be halogenated may preferably be used in excess.

A suitable method of carrying out the invention is as follows:

The organic liquid to be halogenated is heated to boiling in a still and the vapors are passed through a column and condensed in a Woolff's bottle. The liquid condensate is then caused to flow through a tower wherein it may be charged, if required, with a halogenation catalyst. After leaving the tower, the material is caused to descend in a vertical tube, charged or not with filling material and having a constricted portion in which it meets the halogen introduced by a capillary. Halogenation begins at once and a mixture of the mono-halogen derivative and the excess of the starting material returns to the still through a siphon. The halogenation is continued until the organic liquid which has been introduced is transformed completely or nearly completely into the mono-halogen derivative. The hydrogen halide formed during this treatment is eliminated in a suitable manner from the halogenation zone.

As substances to be mono-halogenated there may for instance be used the following:

Hydrocarbons as propane, butane, isobutane, the isomeric pentanes, hexanes, heptanes, octanes, dodecane as well as mixtures of the isomeric products, benzene, toluene, xylene, naphthalene in the melted condition; ketones such as acetone, methylethyl ketone, diethyl ketone, di-isopropyl ketone, cyclohexanone, methylcyclohexanone, benzophenone, acetophenone (in the presence of a catalyst the halogen enters the nucleus; in the absence of a catalyst, however, it enters the side chain), acids such as glacial acetic acid, propionic acid, butyric acid, isobutyric acid. Also into the mon-halogen derivatives of these starting materials a further halogen atom may be introduced. Preferably, however, the halogenated or further halogenated product must have a boiling point which is so much above the boiling point of the starting material that the two products may be separated in one column.

As halogenating agents there may be used chlorine and bromine, furthermore sulfuryl chloride and sulfuryl bromide, thionyl chloride and thionyl bromide.

The reaction temperature may be directly below the boiling point of the starting material or at 0° and more, for instance at room temperature. The capillary may have a diameter as that named in the copending application of even date filed in the name of Paul Heisel.

As halogenation catalysts there may be used any of the substances which accelerate halogenation, and are customarily used for this purpose, for instance ferric chloride, antimony chloride, sulfur chloride and others. It may also be suitable to expose the reaction zone to actinic light.

The following examples serve to illustrate the invention, but they are not intended to limit it thereto, reference being made to the accompanying drawing, in which Fig. 1 illustrates diagrammatically an apparatus suitable for carrying out the invention, and Fig. 2 shows a part on an enlarged scale.

(1) 78 kilos of benzene are heated to boiling in a still 1 (Fig. 1). The vapors ascend in a column 2 provided with a dephlegmator and are condensed in a Woolff's bottle 3. From this bottle the condensed benzene flows through a tower 9 filled with ferric chloride and then descends through a vertical tube 4, having a constricted portion in which it meets chlorine introduced through a capillary 5. The constricted portion is suitably shaped as illustrated in Fig. 2. The benzene accumulates in the annular space 7 around the top of the narrow tube 8 and then flows in counter-current to the chlorine along the wall of the tube in a thin layer, like an envelope. The hydrochloric acid formed leaves the apparatus through the tube 4 and the cooled condenser 6. The monochlorobenzene which has been formed and the excess of benzene flow together into the still through a siphon. When the benzene introduced into the still has been transformed into monochlorobenzene, the introduction of chlorine is discontinued and the halogenation product is purified by distillation. There are obtained 110 kilos of monochlorobenzene and about 3 kilos of dichlorobenzenes.

(2) 72.1 kilos of a mixture of pentanes are heated to boiling in a still and the vapors are condensed in a Woolff's bottle in a manner similar to that described in Example 1. From this bottle the mixture of pentanes flows downwardly through a vertical tube having a constricted portion in which it meets chlorine introduced in counter-current through a capillary. The chlorination occurs between 0° and 30° C. The mixture of amyl chlorides which has been formed and the unchanged starting material flow together back into the still. When the mixture of pentanes is almost completely transformed into amyl chlorides the introduction of chlorine is discontinued and the chlorides are purified by distillation. There are obtained 105 kilos of amyl chlorides which boil between 92° C. and 107° C. and 2.2 kilos of more highly chlorinated by-products.

(3) In a lead-lined vessel 6 kilos of glacial acetic acid are heated to boiling, and the vapors are condensed in a manner similar to that described in Example 1 in a Woolff's bottle, from which the condensate enters a vessel in which it is continuously charged with a small quantity of a catalyst, for instance sulfur chloride. The acid charged with the catalyst then flows downwardly through a vertical tube at a temperature between 90° C. and 100° C. in counter-current to bromine vapor. When the glacial acetic acid has been completely monobrominated, the reaction is interrupted. There are obtained 13.8 kilos of monobromacetic acid and 0.2 kilo of dibromacetic acid.

(4) In a boiler having a column chlorocylohexane is maintained at about 130° C. to 140° C., whilst preheated cyclohexane is introduced through a cylinder mounted at the head of the column. The cyclohexane vapor is condensed on the other side of the dephlegmator and the liquid cyclohexane is collected in a Woolff's bottle and then flows in a thin layer, as described in Examples 1 to 3, along the walls of a vertical tube having a constricted portion in which it meets in counter-current chlorine introduced through a capillary, while cooling. The cyclohexyl chloride formed and the unaltered cyclohexane return together to the still from which the cyclohexane continues in circulation. The chlorination product is continuously removed from the still. In some cases it may still contain a small percentage of cyclohexane and about 2 per cent of more highly chlorinated products. The cyclohexyl chloride may be purified by a simple distillation.

(5) In a lead-lined vessel 6 kilos of glacial acetic acid are heated to boiling, and the vapors are condensed in a manner similar to that described in Example 1 in a Woolff's bottle, from which the condensate enters a vessel in which it is continuously charged with a small quantity of a catalyst, for instance sulfur chloride. The acid charged with the catalyst then flows downwardly through a vertical tube at a temperature between 90° and 100° C. in counter-current to chlorine. When the glacial acetic acid has been completely chlorinated, the reaction is interrupted. There are obtained 9.3 kilos of monochloracetic acid and 0.2 kilo of dichloracetic acid.

(6) 10 kilos of a petroleum fraction boiling between 100° C. and 125° C. and chiefly consisting of a mixture of heptanes are chlorinated in a manner similar to that described in Example 2. The temperature of chlorination varies between 30° C. and 70° C. When most of the mixture of heptanes has been chlorinated the reaction product which is present in the reaction vessel is subjected to fractionate distillation. A mixture of chlorinated hydrocarbons 93 per cent of which consists of monochlorinated substances boiling between 142° C. and 160° C. are obtained besides small quantities of unchanged starting material.

We claim:
1. The process of monohalogenating organic compounds which are liquid at the halogenation temperature and contain at least one atom capable of being substituted by halogen which comprises blowing the halogen through a capillary counter-current to the liquid organic compound to be halogenated, flowing in a thin cylindrical stream at a temperature lower than the boiling point of the monohalogen compound obtained.

2. The process of monohalogenating organic compounds which are liquid at the halogenation temperature and contain at least one atom capable of being substituted by halogen which comprises blowing the halogen through a capillary counter-current to the liquid organic compound to be halogenated, containing a catalyst known to promote halogenation, said compound flowing in a thin cylindrical stream at a temperature lower than the boiling point of the monohalogen compound obtained.

3. The process of preparing monochlorbenzene which comprises blowing chlorine through a capillary counter-current to a thin cylindrical stream of liquid benzene.

4. The process of preparing monochlorine products of a mixture of isomeric pentanes which comprises blowing chlorine through a capillary counter-current to a thin cylindrical stream of the liquid pentanes.

5. The process of preparing monochloracetic acid which comprises blowing chlorine through a capillary counter-current to a thin cylindrical stream of glacial acetic acid.

PAUL HEISEL.
ALBERT HENDSCHEL.